United States Patent
Jing et al.

(10) Patent No.: US 10,992,232 B2
(45) Date of Patent: Apr. 27, 2021

(54) DC-DC CONVERTER SYSTEM WITH CONFIGURABLE PHASE SHIFT SYNCHRONIZATION

(71) Applicant: TEXAS INSTRUMENTS INCORPORATED, Dallas, TX (US)

(72) Inventors: Weibing Jing, Beijing (CN); Liang Zhang, Beijing (CN); Dan Li, Beijing (CN); Qi Yang, Beijing (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/515,375

(22) Filed: Jul. 18, 2019

(65) Prior Publication Data
US 2020/0274448 A1     Aug. 27, 2020

Related U.S. Application Data

(63) Continuation of application No. PCT/CN2019/076288, filed on Feb. 27, 2019.

(51) Int. Cl.
*H02M 3/158* (2006.01)
*H02M 3/157* (2006.01)

(52) U.S. Cl.
CPC ........ *H02M 3/1584* (2013.01); *H02M 3/157* (2013.01); *H02M 2003/1586* (2013.01)

(58) Field of Classification Search
CPC ...... H02M 3/156; H02M 3/157; H02M 3/158; H02M 3/1584; H02M 2003/1586; G05F 1/563; G05F 1/565; G05F 1/575; G05F 1/59
See application file for complete search history.

(56) References Cited

U.S. PATENT DOCUMENTS

| | | | |
|---|---|---|---|
| 6,356,158 B1* | 3/2002 | Lesea | H03L 7/107 331/11 |
| 7,259,687 B2 | 8/2007 | Wiktor et al. | |
| 7,616,463 B2* | 11/2009 | Burstein | H02M 3/1584 363/72 |
| 10,425,009 B2* | 9/2019 | Couleur | H02M 3/1584 |
| 2008/0198636 A1 | 8/2008 | Yang et al. | |

(Continued)

FOREIGN PATENT DOCUMENTS

| | | |
|---|---|---|
| CN | 102075072 A | 5/2011 |
| CN | 102136793 A | 7/2011 |

(Continued)

OTHER PUBLICATIONS

Search Report for PCT Application No. PCT/CN2019/076288, the international search report dated Sep. 11, 2019, 4 pages.

*Primary Examiner* — Matthew V Nguyen
(74) *Attorney, Agent, or Firm* — Michelle F. Murray; Charles A. Brill; Frank D. Cimino

(57) ABSTRACT

A converter system includes a first converter that includes a synchronizing terminal configured to receive a frequency signal, a synchronizing unit configured to generate a synchronizing signal having a phase shift with respect to the frequency signal, wherein the phase shift is generated based on amplitude of the frequency signal, and a regulator configured to convert a first given signal to a first converted signal, wherein the regulator is phase locked with the synchronizing signal.

19 Claims, 7 Drawing Sheets

(56) References Cited

U.S. PATENT DOCUMENTS

2009/0033266 A1* 2/2009 Kreinbrink ............... H02P 6/15
                                                          318/440
2011/0133553 A1   6/2011 Bui et al.
2018/0269783 A1*  9/2018 Yin .......................... H02M 3/04

FOREIGN PATENT DOCUMENTS

GB       2135543    *  8/1984  ............... H03L 7/14
KR    20070025269   *  3/2007  ............... H02J 3/38

* cited by examiner

US 10,992,232 B2

DC-DC CONVERTER SYSTEM WITH CONFIGURABLE PHASE SHIFT SYNCHRONIZATION

This application is a continuation of PCT Application No. PCT/CN2019/076288 filed Feb. 27, 2019, which Application is hereby incorporated herein by reference in its entirety.

TECHNICAL FIELD

The present disclosure relates to integrated circuits and, more particularly, to a DC-DC converter system with configurable phase shift synchronization.

BACKGROUND

DC-DC converters are switching power supplies widely used to convert a DC input to a desired DC output to drive a load. More and more converter systems require multiple DC-DC converters. Each DC-DC converter in a converter system includes a switching regulator that is typically operated based on an individual pulse width modulation (PWM) signal having a duty cycle determined based on a ratio between the DC input and the desired DC output.

SUMMARY

The present disclosure relates to integrated circuits and, more particularly, to a DC-DC converter system with configurable phase shift synchronization. A DC-DC converter system may include multiple DC-DC converts that are operated on PWM signals with different duty cycles to convert a DC input signal to different DC output signals.

In one example, the present disclosure provides a converter system including a first converter that includes a synchronizing terminal configured to receive a frequency signal, a synchronizing unit configured to generate a synchronizing signal with a phase shift with respect to the frequency signal, wherein the phase shift is generated based on amplitude of the frequency signal, and a regulator configured to convert a first given signal to a first converted signal, wherein the regulator is phase locked with the synchronizing signal. Therefore, the first converter is operated on a PWM signal having a frequency based on a frequency of the frequency signal, and a phase shift with respect to the frequency signal adjustable through the amplitude of the frequency signal.

In another example, the present disclosure provides a method of operating a converter system that includes a first converter. The method includes: sensing a frequency signal provided at a synchronizing terminal of the first converter, generating a synchronizing signal with a phase shift with respect to the frequency signal, wherein the phase shift is based on amplitude of the frequency signal, and converting a first given signal to a first converted signal based on the synchronizing signal. Therefore the phase shift of the first converter of the converter system is adjustable through the amplitude of the frequency signal.

DETAILED DESCRIPTION

The present invention relates to DC-DC converter systems with configurable phase shift synchronization.

Figure 1:
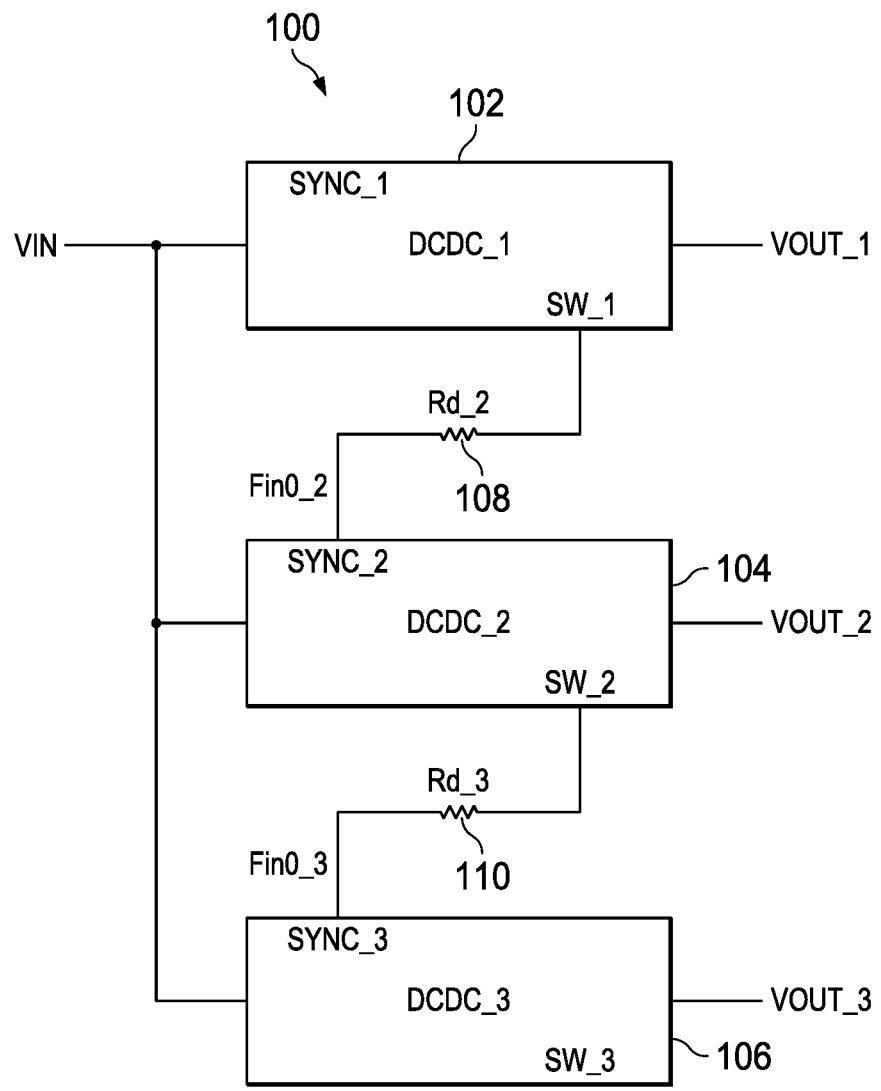
FIG. 1 is a schematic block diagram of a converter system in accordance with an implementation of the present disclosure.

Referring now to FIG. 1, a schematic block diagram of a DC-DC converter system 100 in accordance with an implementation of the present disclosure is shown. The converter system 100 includes N DC-DC converters respectively for converting a DC input signal to different DC output signals, wherein N is a natural number greater than or equal to 2. As the example shown in FIG. 1, N is 3, the system 100 includes first to third DC-DC converters 102 to 106 respectively for converting a DC input voltage VIN to DC output voltages VOUT_1, VOUT_2 and VOUT_3.

Each of the first to third DC-DC converters 102 to 106 is a switching power supply operated based on an individual PWM signal. In a preferred embodiment, the PWM signal is generated based on a frequency signal Fin0_N provided to a synchronizing terminal SYNC_N thereof. Each DC-DC converter DCDC_N generates a switching signal SW_N at a switching node SW_N thereof based on the PWM signal during operation. In a preferred example of the present disclosure, the first to third DC-DC converters 102 to 106 are cascaded in a chain through resistive elements. The converter system 100 includes a first resistive element 108 coupled between the switching node SW_1 of the first DC-DC converter 102 and the synchronizing terminal SYNC_2 of the second DC-DC converter 104, and a second resistive element 110 coupled between the switching node SW_2 of the second DC-DC converter 104 and the synchronizing terminal SYNC_3 of the second DC-DC converter 106. The frequency signals Fin0_2 and Fin0_3 of the second and third DC-DC converters 104 and 106 are generated respectively based on the switching signals SW_1 and SW_2 and resistance Rd_2 and Rd_3 of the first and second resistive elements 108 and 110.

Figure 2:
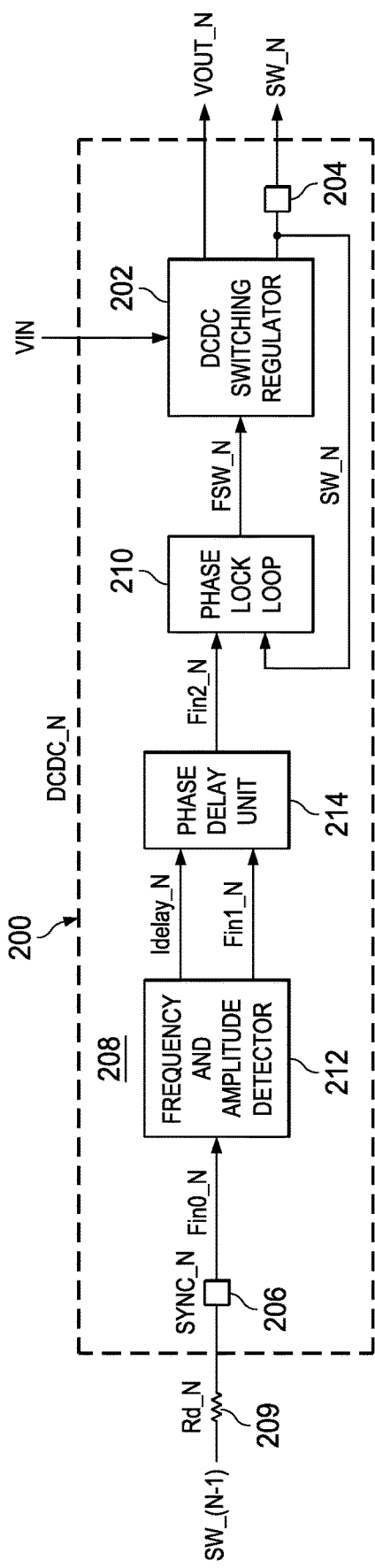
FIG. 2 is a schematic block diagram of a converter of the converter system of FIG. 1 in accordance with an implementation of the present disclosure.

FIG. 2 is a schematic block diagram of a DC-DC converter DCDC_N 200 of the converter system 100 of FIG. 1 in accordance with an implementation of the present disclosure. For example, the DC-DC converter 200 is the second or third DC-DC converters 104 or 106 of the converter system 100 of FIG. 1.

The DCDC converter 200 includes a regulator 202 operated based on a switching frequency signal FSW_N and generating a switching signal SW_N at a switching node 204 during operation. The DC-DC converter 200 also includes a synchronizing terminal SYNC_N 206 configured to receive a frequency signal Fin0_N, and a synchronizing unit 208 configured to generate a synchronizing signal Fin2_N with a phase shift with respect to the frequency signal Fin0_N, wherein the phase shift is based on amplitude of the frequency signal Fin0_N. In a preferred example, the frequency signal Fin0_N is a current flowing through a resistive element Rd_N 209 that has a first terminal coupled to the synchronizing terminal SYNC_N and an opposite second terminal for receiving a switching signal SW_(N−1). The DC-DC converter 200 further includes a phase locked loop (PLL) 210 coupled between the synchronizing unit 208 and the regulator 202 for providing the switching frequency signal FSW_N that is phase locked with the synchronizing signal Fin2_N. In a preferred example, the PLL 210 generates the switching frequency signal FSW_N by locking the switching signal SW_N generated at the switching node 204 with the synchronizing signal Fin2_N.

The synchronizing unit 208 includes a frequency and amplitude detector 212 configured to detect the frequency and amplitude of the frequency signal Fin0_N, and generate an intermediate frequency signal Fin1_N and a phase delay signal Idelay_N, wherein the intermediate frequency signal Fin1_N is synchronized with the frequency signal Fin0_N, and the phase delay signal Idelay_N is in proportion to the amplitude of the frequency signal Fin0_N. The synchronizing unit 208 also includes a phase delay unit 214 coupled to the frequency and amplitude detector 212, and generating the synchronizing signal Fin2_N based on the intermediate signal Fin1_N and the phase delay signal Idelay_N, wherein a frequency of the synchronizing signal Fin2_N is synchronized with the frequency of the intermediate signal Fin1_N, and a phase shift Tdelay_N between the synchronizing signal Fin2_N and the intermediate signal Fin1_N is in proportion to the phase delay signal Idelay_N.

Figure 3:
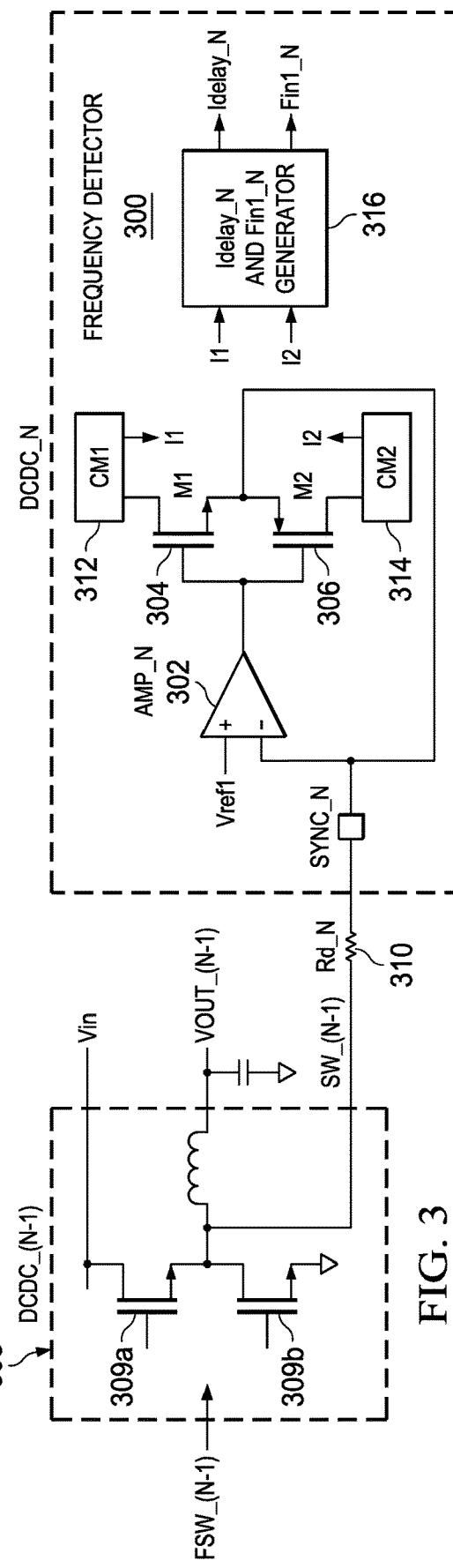
FIG. 3 is a schematic block diagram of a frequency and amplitude detector of the converter of FIG. 2 in accordance with an implementation of the present disclosure.

FIG. 3 shows a schematic block diagram of a frequency and amplitude detector 300 of the DC-DC converter 200 of FIG. 2 in accordance with an implementation of the present disclosure. The frequency and amplitude detector 300 is an example of the frequency and amplitude detector 212 of FIG. 2. In a preferred example, the frequency and amplitude detector 300 includes an amplifier 302 having a positive input terminal for receiving a first reference voltage Vref1 and a negative input terminal coupled to the synchronizing terminal SYNC_N of the DC-DC converter DCDC_N. The first reference voltage Vref1 can be generated internally within the DC-DC converter 200 or provided by an external voltage source. The frequency and amplitude detector 300 also includes a pair of first and second transistors 304 and 306 configured to electrically couple an output terminal of the amplifier 300 to the negative input terminal of the amplifier 300. The first and second transistors 304 and 306 have gate terminals coupled together and to the output terminal of the amplifier 300 and source terminals coupled together and to the negative input terminal of the amplifier 300. In a preferred example, the first transistor 304 is an N-channel transistor and the second transistor 306 is a P-channel transistor. The first and second transistors 304 and 306 are coupled in series between a voltage supply (not shown) and ground.

In a preferred example, during operation, a previous DC-DC converter DCDC_(N−1) 308 in the chain generates a switching signal SW_(N−1) at the switching node thereof based on a switching frequency signal FSW_(N−1), wherein N is a natural number greater than 1. The switching node is a joint node coupling a high-side transistor 309a and a low-side transistor 309b. The high-side and low-side transistors 309a and 309b are reciprocally switched on and off, which generates the switching signal SW_(N−1) alternating between the input DC voltage VIN and ground. Although the previous DC-DC converter 308 shown in FIG. 3 is a buck converter, it can also be a boost converter including high-side and low-side transistors coupled at a switching node. A resistive element 310 is coupled between the switching node of the previous DC-DC converter DCDC_(N−1) 308 and the synchronizing terminal SYNC_N of the DC-DC converter DCDC_N. In a preferred example, the first reference voltage Vref1 is set to be less than the input DC voltage VIN. Therefore, the switching signal SW_(N−1) causes a current to flow through the resistive element Rd_N 310 back and forth. When the switching signal SW_(N−1) is at ground, the first transistor 304 electrically couples the output terminal and the negative input terminal of the amplifier 302 allowing the current to flow through the resistive element 310 in a first direction, and when the switching signal SW_(N−1) is at the input DC voltage VIN, the second transistor 306 electrically couples the output terminal and the negative input terminal of the amplifier 302 allowing the current to flow through the resistive element 310 in an opposite second direction. The amplifier 302 is operative to hold a voltage at the negative input terminal at the first reference voltage Vref1.

The frequency and amplitude detector 300 includes a first current mirror 312 coupled to the first transistor 304 and configured to generate a first current signal I1 in proportion to the current flowing through the resistive element 310 in the first direction, and a second current mirror 314 coupled to the second transistor 306 and configured to generate a second current signal I2 proportional to the current flowing through the resistive element 310 in the second direction. In a preferred example, the first and second current signals I1 and I2 are respectively identical to the current flowing through the resistive element 310 in the first and second directions, and have amplitudes defined in accordance with the equations below:

$$I1 = Vref1/Rd\_N \qquad (1)$$

$$I2 = (VIN - Vref1)/Rd\_N \qquad (2)$$

The frequency and amplitude detector 300 further includes a signal generator 316 that generates the intermediate frequency signal Fin1_N and phase delay signal Idelay_N based on at least one of the first and second current signals I1 and I2. In a preferred example, the intermediate frequency signal Fin1_N is a clock signal generated based on a frequency of one of the first and second current signals I1 and I2 or a combination of the first and second current signals I1 and I2, and the phase delay signal Idelay_N is a current in proportion to amplitude of one of the first and second current signals I1 and I2 or a combination, e.g. a summation, of the first and second current signals I1 and I2.

Figure 4:
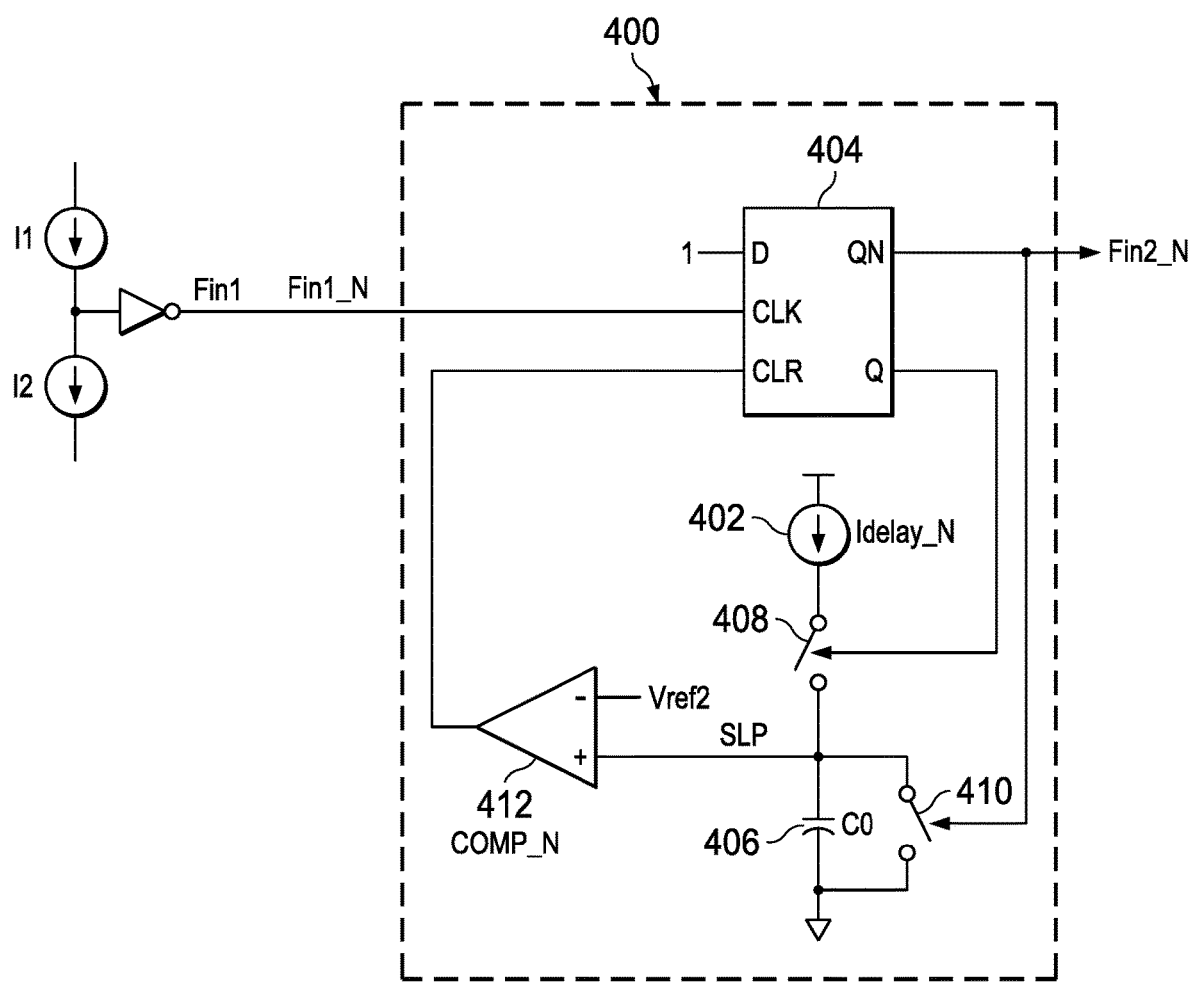
FIG. 4 is a schematic block diagram of a phase delay unit of the converter of FIG. 2 in accordance with an implementation of the present disclosure.

FIG. 4 shows a schematic block diagram of a phase delay unit 400 of the DC-DC converter 200 of FIG. 2 in accordance with an implementation of the present disclosure. The phase delay unit 400 is an example of the phase delay unit 214 of FIG. 2. The phase delay unit 400 includes a current source 402 for providing a charging current proportional to the phase delay signal Idelay_N. In the example shown in FIG. 4, the charging current is identical to the phase delay signal Idelay_N received from the frequency and amplitude detector 300 of FIG. 3. The phase delay unit 400 also includes a flip-flop 404 configured to sample a data signal with the intermediate frequency signal Fin1_N and controlling the current source 402 to repeatedly charging and discharging a capacitive element 406 based on an output signal of the flip-flop 404. The capacitive element 406 includes a first terminal coupled to the current source 402 and an opposite second terminal coupled to ground. The capacitive element 406 with a capacitance C0 can either be a part of the phase delay unit 400 or separate from the phase delay unit 400. The phase delay unit 400 includes a first switch 408 coupled between the current source 402 and the first terminal of the capacitive element 406, and a second switch 410 coupled in parallel with the capacitive element 406. The first and second switches 408 and 410 can be transistors operating between ON and OFF status respectively controlled by the output of the flip-flip 404. For example, the first switch 408 is switched on and the second switch 410 is switched off when the output signal at a positive output terminal Q of the flip-flip 404 is at a high level, which enables the current source 402 to charge the capacitive element 406 providing a slope signal SLP at the first terminal of the capacitive element 406. The first switch 408 is switched off and the second switch 410 is switched on when the output signal at the positive output terminal Q is at a low level, which disconnects the capacitive element 406 from the current source 402 and discharges the capacitive element 406.

The phase delay unit 400 further includes a comparator 412 having a first input terminal coupled to a second reference voltage Vref2, a second input terminal coupled to the first terminal of the capacitive element 406, and an output terminal coupled to a clear terminal CLR of the flip-flop 404. The second reference voltage Vref2 can be generated internally within the DC-DC converter 200 or provided by an external voltage source. In a preferred example, the flip-flop 404 is a D flip-flop and has a data input set to a high level which is periodically sampled by a rising edge of the intermediate frequency signal Fin1_N. The comparator 412 is configured to generate a clear signal CLR that de-asserts the output signal at the positive output terminal Q when a voltage at the first terminal of the capacitive element 406 reaches the second reference voltage Vref2. Therefore, in the example shown in FIG. 4, the output signal at the positive output terminal Q is periodically de-asserted Tdelay_N after the rising edge of the intermediate frequency signal Fin1_N. Therefore, Tdelay_N is defined in accordance with the equation below:

$$T\text{delay}\_N = C0 * V\text{ref2} / I\text{delay}\_N \quad (3)$$

In a preferred example, Idelay_N=I1+I2. By employing substitution, Equation (3) can be expanded to derive Equation (4):

$$T\text{delay}\_N = \frac{C0 * V\text{ref2}}{\frac{VIN - V\text{ref1}}{Rd\_N} + \frac{V\text{ref1}}{Rd\_N}} = \frac{C0 * V\text{ref2}}{VIN} * Rd\_N \quad (4)$$

In a preferred example, the synchronizing signal Fin2_N is generated at a negative output terminal QN of the flip-flop 404 having a rising edge Tdelay_N after the rising edge of the intermediate frequency signal Fin1_N. Therefore, the phase shift Tdelay_N between the synchronizing signal Fin2_N and the intermediate frequency signal Fin1_N is adjustable through the resistance Rd_N of the resistive element 310.

Referring back to FIG. 2, the PLL 210 provides the switching frequency signal FSW_N that has a phase locked with the synchronizing signal Fin2_N. As the intermediate frequency signal Fin1_N is synchronized with the switching signal SW_(N−1), the DC-DC converter DCDC_N 200 is operated on the switching frequency signal FSW_N that has a same frequency with the switching signal SW_(N−1) and the phase shift Tdelay adjustable through the resistance Rd_N of the resistive element 209 that is coupled to a single synchronizing terminal SYNC_N of the DC-DC converter 200.

Figure 5:
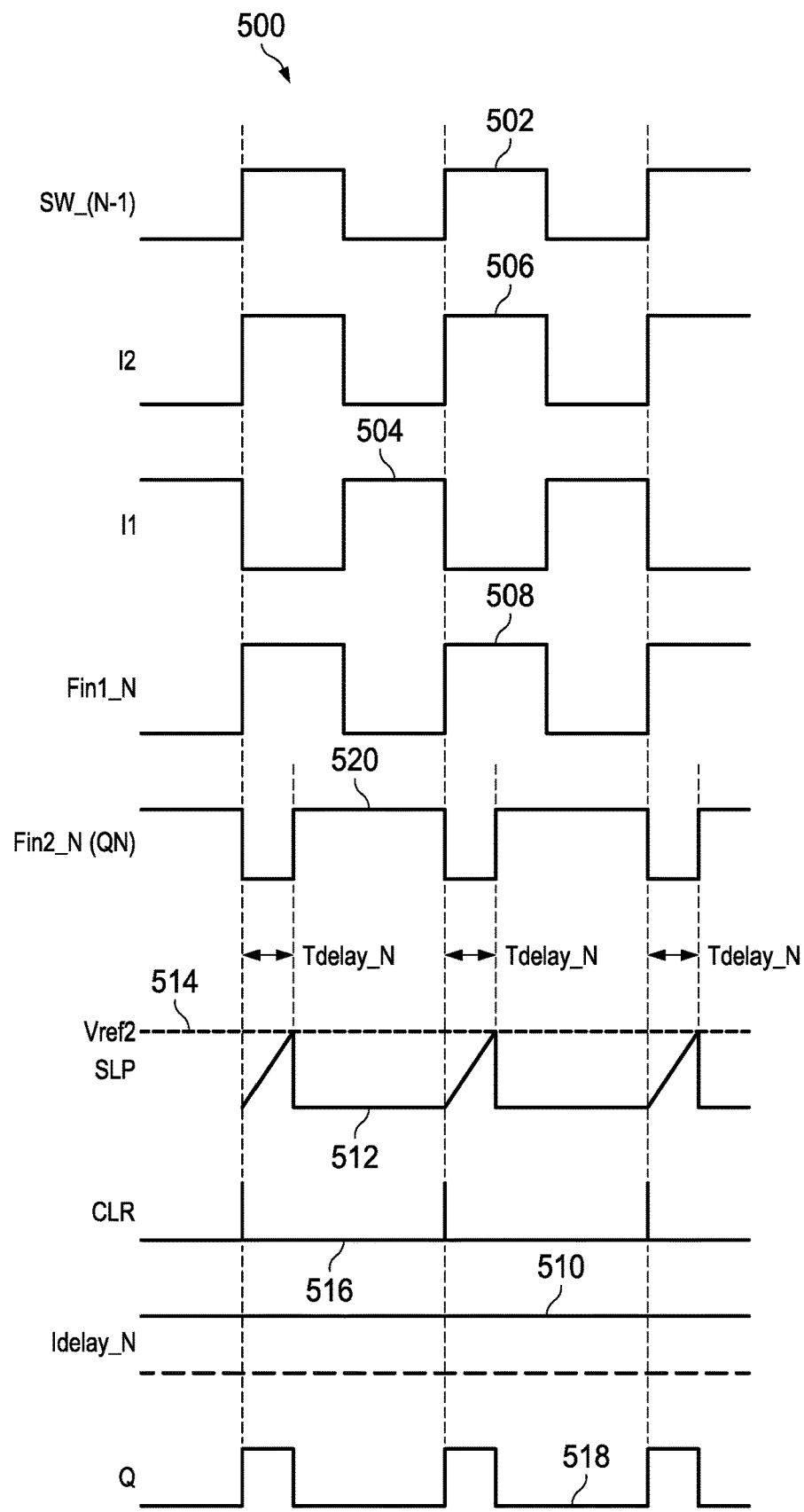
FIG. 5 is a timing diagram illustrating generating the synchronizing signal during operation of the DC-DC converter of FIG. 2 with reference to the frequency and amplitude detector of FIG. 3 and the phase delay unit of FIG. 4 in accordance with an implementation of the present disclosure.

FIG. 5 is a timing diagram 500 illustrating generating the synchronizing signal Fin2_N during operation of the DC-DC converter 200 of FIG. 2 with reference to the frequency and amplitude detector 300 of FIG. 3 and the phase delay unit 400 of FIG. 4 in accordance with an implementation of the present disclosure. The timing diagram 500 demonstrates the switching signal SW_(N−1) provided at the second end of the resistive element 209 at 502, the first and second current signals I1 and I2 representing the current flowing through the resistive element 209 in first and second directions at 504 and 506, and the intermediate frequency signal Fin1_N at 508. In a preferred example, the first current signal I1 504 is half cycle shifted from the switching signal SW_(N−1) 502, the second current signal I2 506 is synchronized with the switching signal SW_(N−1) 502, and the intermediate frequency signal Fin1_N 508 is synchronized with the second current signal I2 506. The phase delay signal Idelay_N is demonstrated at 510, which is in proportion to amplitude of at least one of the first and second current signals 504 and 506, or a combination, e.g. a summation, of the first and second current signals 504 and 506.

The timing diagram 500 further demonstrates the slope signal SLP provided at the first terminal of the capacitive element 406 of FIG. 4 at 512, the second reference signal Vref2 at 514, the clear signal CLR provided to the flip-flop 404 of FIG. 4 at 516, the output signal at the positive output terminal Q of the flip-flop 404 at 518, and the synchronizing signal Fin2_N provided at the negative output terminal QN of the flip-flop 404 at 520. In the example shown in FIG. 5, a rising edge of the intermediate frequency signal 508 samples the constant high level signal provided to the data input terminal of the flip-flop 404, which asserts the output signal 518. The output signal 518 starts to enable the current source Idelay_N to charge the capacitive element 406, which causes the slope signal 512 to increase. A pulse 522 of the clear signal 516 is generated when the slope signal 512 reaches the second reference voltage Vref2 514, which de-asserts the output signal 518, and, in turn, discharges the slope signal 512 to ground. A next rising edge of the intermediate frequency signal Fin1_N 508 again asserts the output signal 518, which is then de-asserted when the slope signal 512 reaches the second reference voltage Vref2 514, thereby providing the synchronizing signal Fin2_N 520 which has a phase shift Tdelay_N with respect to the switching signal SW_(N−1) 502, wherein the phase shift Tdelay_N is the time to charge the first end of the capacitive element 406 from ground to the second reference voltage Vref2, which is adjustable based on the resistance Rd_N of resistive element 209 coupled to a single pin, i.e. the synchronizing terminal SYNC_N of the DC-DC converter DCDC_N 200.

Referring back to FIG. 1, by cascading the first to third DC-DC converters 102 to 106 through the first and second resistive elements 108 and 110, the first to third DC-DC converters 102 to 106 in the system 100 are operated on a same frequency, and a phase shift Tdelay_N between each two adjacent DC-DC converters DCDC_(N−1) and DCDC_N is adjustable based on the resistance Rd_N of a resistive element coupled therebetween. In a preferred embodiment, the phase shift Tdelay_N is configured based on a converting ratio of the previous DC-DC converter DCDC_(N−1). In a preferred embodiment, the resistance Rd_N is selected such that the phase shift Tdelay_N is greater than or equal to a duty period of the switching signal SW_(N−1) of the DC-DC converter DCDC_(N−1).

Figure 6:
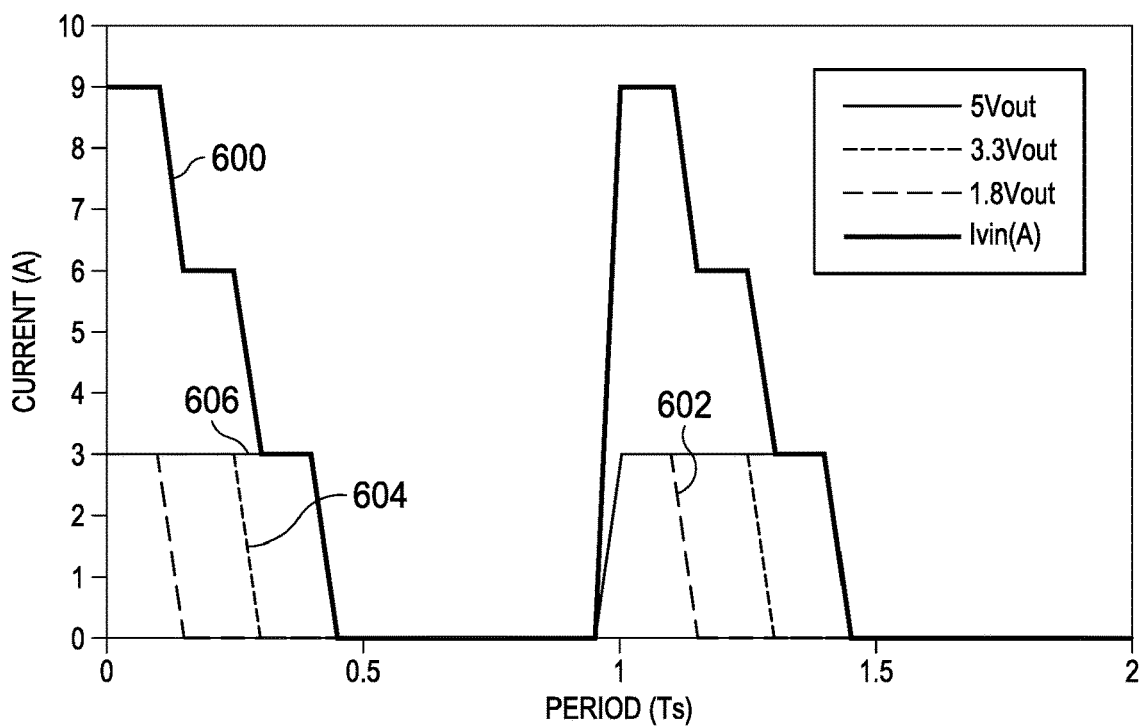
FIG. 6 is a simulation diagram illustrating an input current of a converter system that includes three converters without phase shift between each other.

FIG. 6 is a simulation diagram illustrating an input current 600 of a converter system that includes first to third converters operated on a same frequency but without phase shift between each other. In the example shown in FIG. 6, the first to third DC-DC converters respectively convert a 12V input voltage to 5V, 3.3V and 1.8V output voltages, and each converter has a 3A output current. The first to third switching frequency signals of the first to third DC-DC converters are respectively demonstrated at 602, 604 and 606. As shown in FIG. 6, a sharp rising edge of the input current 600 from 0A to 9A occurs at beginning of each period, which results in large EMI at input node of the converter system.

Figure 7:
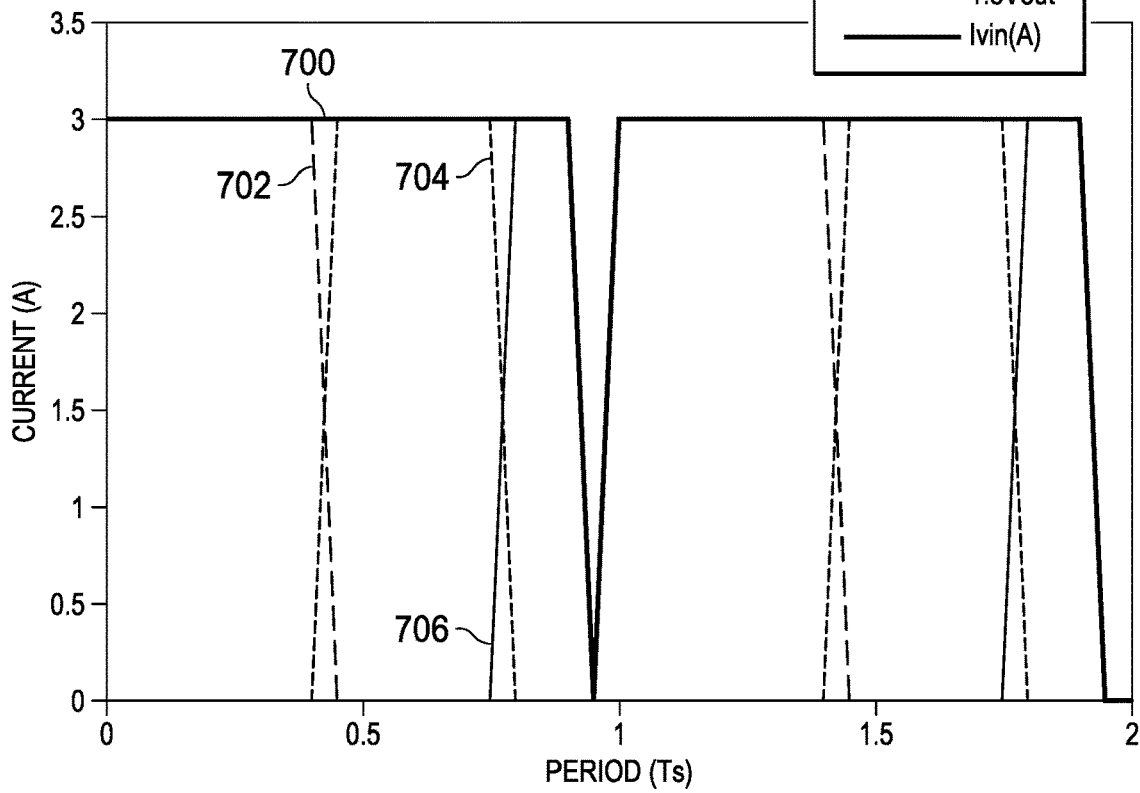
FIG. 7 is a simulation diagram illustrating an input current of a converter system that includes converters with phase shift between each other.

FIG. 7 is a simulation diagram illustrating an input current 700 of a converter system including three converters operated on a same frequency f and with phase shift between each other, for example, the converter system 100 of FIG. 1. Similar to the converter system in FIG. 6, the first to third DC-DC converters 102 to 106 respectively convert a 12V input voltage to 5V, 3.3V and 1.8V output voltages, and each converter has a 3A output current. The first to third switching frequency signals of the first to third DC-DC converters are respectively demonstrated at 702, 704 and 706. In a preferred embodiment, the phase shift Tdelay_N between each two adjacent DC-DC converters DCDC_(N−1) and DCDC_N are configured based on the duty period of the previous DC-DC converter DCDC_(N−1), such that there is no overlap between duty periods of the two adjacent DC-DC converters DCDC_(N−1) and DCDC_N. In the example shown in FIG. 7, Tdelay_2 between the first and second DC-DC converters 102 and 104 is configured based on the duty period of the first DC-DC converter 102, i.e., Tdelay 2=(5/12)*Ts, and Tdelay_3 between the second and third DC-DC converters 104 and 106 is configured based on the duty period of the second DC-DC converter 104, i.e., $$Tdelay\_3 = \left(\frac{3.3}{12}\right) * Ts,$$

wherein Ts=1/f.

Figure 8:
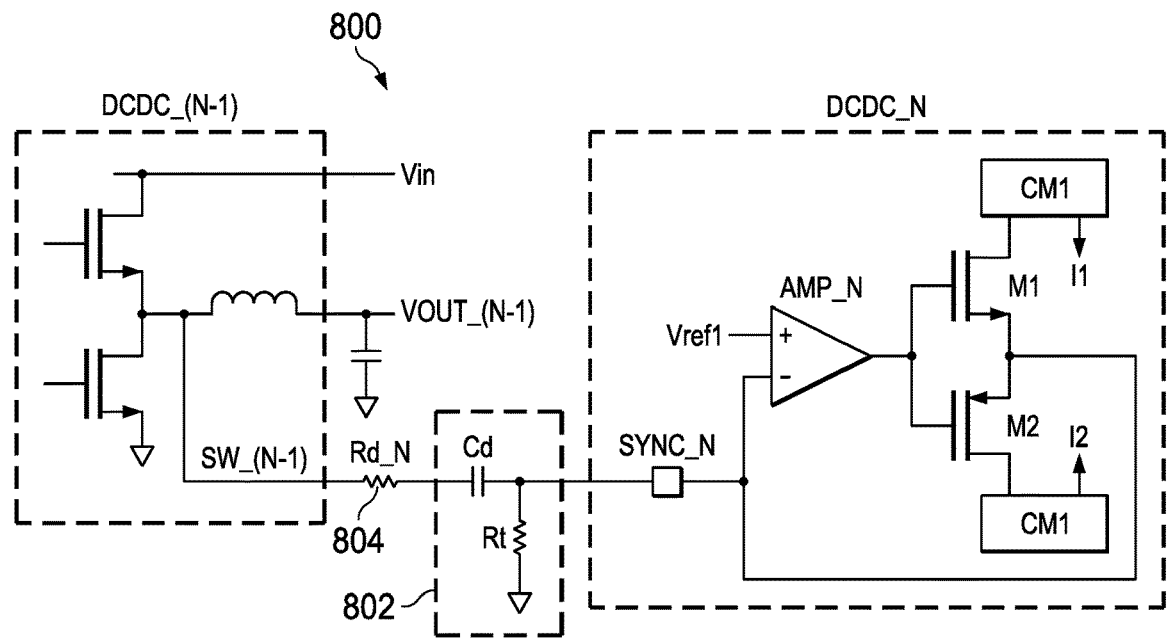
FIG. 8 is a schematic block diagram of a portion of a converter system in accordance with another implementation of the present disclosure.

FIG. 8 is a schematic block diagram of a portion of a converter system 800 in accordance with another implementation of the present disclosure. The converter system 800 is substantially similar to the converter system 100 of FIG. 1 except that the converter system 800 further includes a high-pass filter 802 coupled between the resistive element Rd_N 804 and the synchronizing terminal SYNC_N of the DC-DC converter DCDC_N. In a preferred example, the high-pass filter 802 provides an alternating current to the synchronizing terminal SYNC_N of the DC-DC converter DCDC_N when a switching signal is provided at the second end of the resistive element Rd_N 804, and provides a direct current to the synchronizing terminal SYNC_N when no switching signal is provided at the second end of the resistive element Rd_N 804, which enables the DC-DC converter DCDC_N to continue operation when the switching signal SW_(N−1) is not available, for example, the previous DC-DC converter DCDC_(N−1) stops operation.

Figure 9:
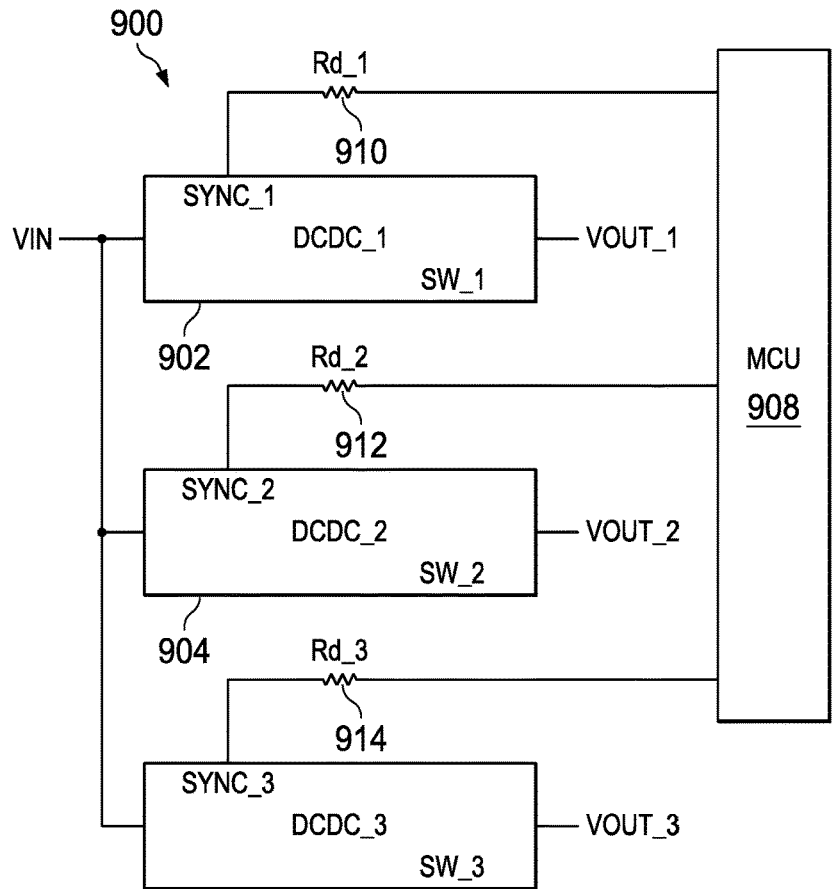
FIG. 9 is a schematic block diagram of a converter system in accordance with yet another implementation of the present disclosure.

FIG. 9 is a schematic block diagram of a converter system 900 in accordance with yet another implementation of the present disclosure. The converter system 900 is similar to the converter system 100 of FIG. 1 except that each DC-DC converter DCDC_N 902, 904 or 906 in the converter system 900 includes a synchronizing terminal SYNC_N coupled to a controller 908 through a corresponding resistive element Rd_N 910, 912 or 914. In a preferred embodiment, the second ends of the resistive elements Rd_N 910, 912 and 914 are coupled to a same terminal of the controller 908 at which a switching signal is provided by the controller 908. The phase shift of each of the DC-DC converters 902, 904 and 906 with respect to the switching signal is adjustable by the corresponding resistive element Rd_N910, 912 or 914 coupled thereto. The controller 908 can be an on-chip micro control unit (MCU) (or microcontroller), and can be a part of the converter system 900 or separate from the converter system 900.

Figure 10:
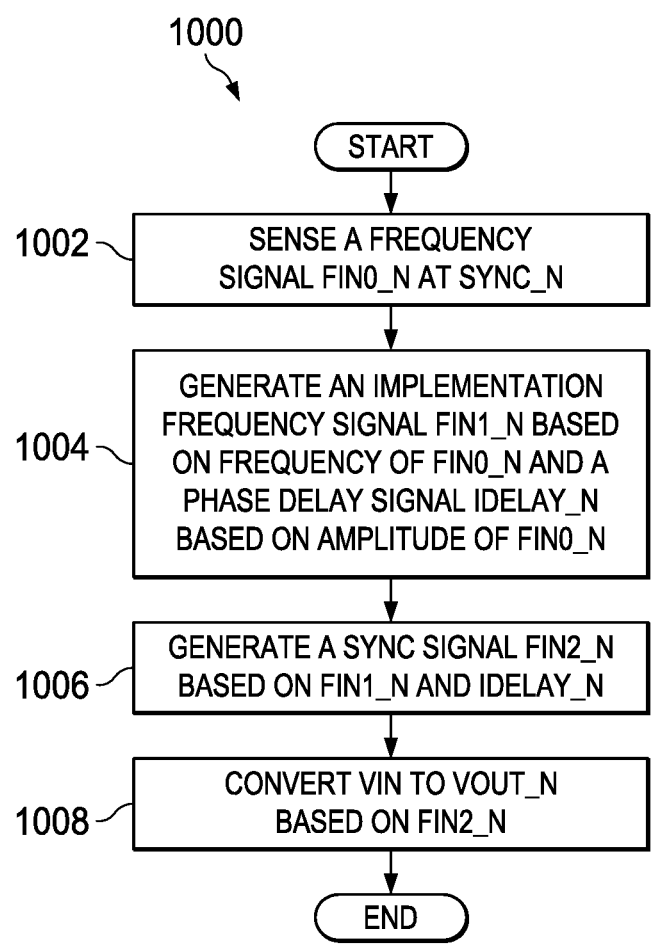
FIG. 10 is a flow chart of a method of operating a DC-DC converter system in accordance with an implementation of the present disclosure.

Referring to FIG. 10, a flow chart 1000 of a method of operating a DC-DC converter system in accordance with an implementation of the present disclosure is shown. With reference to the DC-DC converter system 100 of FIG. 1 or the DC-DC converter system 900 of FIG. 9, the DC-DC converter system 100 (900) includes first to third DC-DC converters 102 (902) to 106 (906). With reference to the DC-DC converter DCDC_N 200, for example, the second DC-DC converter 104 of FIG. 1, the DC-DC converter 200 includes a synchronizing terminal SYNC_N 206, a synchronizing unit 208 including a frequency and amplitude detector 212 and a phase delay unit 214 coupled to the frequency and amplitude detector 212, a phase locked loop (PLL) 210 coupled to the synchronizing unit 208 and a regulator 202 operated based on a switching frequency signal FSW_N for converting a given voltage VIN to a converted voltage VOUT_N. In a preferred example, the converter system 100 includes a resistive element Rd_N 209 having a first end coupled to the synchronizing terminal SYNC_N 206.

Starting at Step 1002, the frequency and amplitude detector 212 senses a frequency signal Fin0_N provided at the synchronizing terminal SYNC_N 206. In a preferred embodiment, the frequency signal Fin0_N is provided by providing a switching signal SW_(N−1) at an opposite second end of the resistive element 209 to generate an alternating current flowing through the resistive element 209 as the frequency signal Fin0_N. In a preferred example, with reference to FIG. 1, the switching signal SW_(N−1) is provided from a switching node of another DC-DC converter DCDC_(N−1) of the converter system 100. In another preferred example, with reference to FIG. 9, the switching signal SW_(N−1) is provided by a controller 908. The controller 908 can be an on-chip micro control unit (MCU) (or microcontroller), and can be a part of the converter system 900 or separate from the converter system 900. In yet another preferred embodiment, with reference to FIG. 8, the converter system further includes a high-pass filter 802 coupled between the resistive element Rd_N 804 and the synchronizing terminal SYNC_N of the DC-DC converter DCDC_N. In a preferred example, the high-pass filter 802 provides an alternating current to the synchronizing terminal SYNC_N of the DC-DC converter DCDC_N when a switching signal is provided at the second end of the resistive element Rd_N 804, and provides a direct current to the synchronizing terminal SYNC_N when no switching signal is provided at the second end of the resistive element Rd_N 804, which enables the DC-DC converter DCDC_N to continue operation when the switching signal SW_(N−1) is not available, for example, the previous DC-DC converter DCDC_(N−1) stops operation.

At step 1004, the frequency and amplitude detector 212 generates an intermediate frequency signal Fin1_N based on a frequency of the frequency signal Fin0_N, and a phase delay signal Idelay_N based on amplitude of the frequency signal Fin0_N. In a preferred example, the frequency and amplitude detector 212 generates at least one of first and second current signals I1 and I2 respectively in proportion to the current through the resistive element Rd_N 209 in first and opposite second directions, and generates the intermediate frequency signal Fin1_N based on a frequency of the at least one of the first and second current signals I1 and I2, and the phase delay signal Idelay_N in proportion to amplitude of the at least one of the first and second current signals I1 and I2. In a preferred example, the intermediate frequency signal Fin1_N is a clock signal generated based on a frequency of one of the first and second current signals I1 and I2 or a combination of the first and second current signals I1 and I2, and the phase delay signal Idelay_N is a current in proportion to amplitude of one of the first and second current signals I1 and I2 or a combination, e.g. a summation, of the first and second current signals I1 and I2. The phase delay signal Idelay_N is adjustable through a resistance Rd_N of the resistive element 209.

At step 1006, the phase delay unit 214 generates a synchronizing signal Fin2_N based on the intermediate signal Fin1_N and the phase delay signal Idelay_N, wherein a frequency of the synchronizing signal Fin2_N is based on the frequency of the intermediate signal Fin1_N, and a phase shift Tdelay_N between the synchronizing signal Fin2_N and the intermediate signal Fin1_N is in proportion to the phase delay signal Idelay_N. With reference to the phase delay unit 400 of FIG. 4, the phase delay unit 400 includes a flip-flop 404 for sampling a data signal, for example, "1" with the intermediate frequency signal Fin1_N. An output signal of the flip-flop 404 controls a capacitive element 406 to be repeatedly charged with a charging current proportional to the phase delay signal Idelay_N and discharged. In the example shown in FIG. 4, the charging current is same as the phase delay signal Idelay_N. The comparator 412 toggles the output signal of the flip-flop 404 when a voltage difference across the capacitive element 406 reaches a second reference voltage Vref2. In the example shown in FIG. 4, the data input "1" is sampled by a rising edge of the intermediate signal Fin1_N, and a negative output signal of the flip-flop 404 is provided as the synchronizing signal Fin2_N that has same frequency as and the phase shift Tdelay_N from the intermediate frequency signal Fin1_N. The phase shift Tdelay_N is the time to charge the first end of the capacitive element 406 from ground to the second reference voltage Vref2, which is adjustable based on the phase delay signal Idelay_N. With reference to FIG. 1, the phase shift Tdelay_N between each two adjacent DC-DC converters DCDC_(N−1) and DCDC_N are configured based on the duty period of the previous DC-DC converter DCDC_(N−1), such that there is no overlap between duty periods of the two adjacent DC-DC converters DCDC_(N−1) and DCDC_N.

At step 1008, the regulator 202 converts the given signal VIN to the converted signal VOUT_N based on the synchronizing signal Fin2_N. In a preferred example, the PLL 210 provides the switching frequency signal FSW_N with a phase locked with the synchronizing signal Fin2_N. In a preferred example, the PLL 210 generates the switching frequency signal FSW_N by locking the switching signal SW_N generated at the switching node 204 with the synchronizing signal Fin2_N. Therefore, with a single synchronizing terminal SYNC_N, the DC-DC converter DCDC_N 200 is operated on the switching frequency signal FSW_N with a frequency same a frequency of another DC-DC converter DCDC_(N−1) in the converter system 100, and a phase shift Tdelay_N with respect to the DC-DC converter DCDC_(N−1) adjustable based the resistance Rd_N of the resistive element coupled to the synchronizing terminal SYNC_N.

The description of the preferred embodiments of the present invention has been presented for purposes of illustration and description, but is not intended to be exhaustive or to limit the invention to the forms disclosed. Numerous modifications, changes, variations, substitutions, and equivalents will be apparent to those skilled in the art, without departing from the spirit and scope of the present invention, as described in the claims.

The invention claimed is:
1. A system, comprising:
 a converter, comprising:
  a frequency and amplitude detector having a detector input, the frequency and amplitude detector configured to:
   receive a first signal at the detector input
   generate a second signal based on a frequency of the first signal; and
   generate a third signal based on an amplitude of the first signal;
  a phase delay unit coupled to the frequency and amplitude detector, the phase delay unit configured to generate a fourth signal based on the second signal and the third signal; and
  a regulator having a first output and a second output, the regulator configured to:
   generate, at the first output, an output voltage based on an input voltage; and
   generate, at the second output, a fifth signal phase locked with the fourth signal.

2. The system of claim 1, wherein the converter further comprises a phase locked loop (PLL) coupled between the phase delay unit and the regulator, and the PLL configured to provide a sixth signal phase locked with the fourth signal, wherein the regulator is configured to generate the output voltage based on the input voltage and the sixth signal.

3. The system of claim 1, further comprising a resistive element having a first end and a second end, the first end coupled to the detector input, wherein the first signal is a current through the resistive element, wherein the frequency and amplitude detector is configured to:
 sense the current;
 generate a sixth signal in proportion to a current flowing through the resistive element in a first direction;
 generate a seventh signal in proportion to a current flowing through the resistive element in a second direction;
 generate the second signal based on a frequency of the sixth signal and a frequency of the seventh signal; and
 generate the third signal in proportion to an amplitude of the sixth signal and an amplitude of the seventh signal.

4. The system of claim 3, wherein the frequency and amplitude detector comprises:

an amplifier has a positive input, a negative input, and an amplifier output, the positive input configured to receive a first voltage, and the negative input coupled to the detector input;

a first transistor having a first control terminal, a first current terminal, and a second current terminal, the first control terminal coupled to the amplifier output and the first current terminal coupled to the negative input;

a second transistor having a second control terminal, a third current terminal, and a fourth current terminal, the second control terminal coupled to the amplifier output and the third current terminal coupled to the negative input;

a first current mirror coupled to the second current terminal, the first current mirror configured to generate the sixth signal in proportion to the current through the resistive element in the first direction; and a second current mirror coupled to the fourth current terminal, the second current mirror configured to generate the seventh signal in proportion to the current through the resistive element in the second direction.

5. The system of claim 3, wherein the phase delay unit comprises:

a current source configured to generate a current proportional to the third signal;

a flip-flop configured to:
  sample a data signal with the sixth signal; and
  control the current source to repeatedly charge a capacitive element with the current source and discharge the capacitive element based on an output signal of the flip-flop; and a comparator configured to toggle the output signal of the flip-flop when a voltage difference across the capacitive element reaches a second voltage to generate the fourth signal with a phase shift with respect to the second signal.

6. The system of claim 3, further comprising a high-pass filter coupled between the resistive element and the detector input.

7. The system of claim 3, wherein the converter is a first converter, the output voltage is a first output voltage, the input voltage is a first input voltage, the system further comprising a second converter configured to convert a second input voltage to a second output voltage based on a second switching frequency signal, wherein the second converter has an output configured to output a switching signal, wherein the second converter is configured to generate the switching signal based on the second switching frequency signal, wherein the resistive element is coupled between the output and the detector input.

8. The system of claim 7, wherein a resistance of the resistive element is adjusted based on a ratio between the second output voltage and the second input voltage.

9. The system of claim 3, further comprising a controller coupled to the second end of the resistive element, the controller configured to provide a switching signal at the second end of the resistive element.

10. A circuit comprising a converter, the converter comprising:

a frequency and amplitude detector having a detector input, a first detector output, and a second detector output;

a phase delay unit having a first phase delay input, a second phase delay input, and a phase delay output, the first phase delay input coupled to the first detector output, the second phase delay input coupled to the second detector output;

a phase lock loop having a first phase lock input, a second phase lock input, and a phase lock output, the first phase lock input coupled to the phase delay output; and a regulator having a switching input, a voltage input, a switching output, and a voltage output, the switching input coupled to the phase lock output and the switching output coupled to the second phase lock input.

11. The circuit of claim 10, wherein the frequency and amplitude detector comprising:

an amplifier having a positive input, a negative input, and an amplifier output, the negative input coupled to the detector input;

a first transistor having a first control terminal, a first current terminal, and a second current terminal, the first control terminal coupled to the amplifier output and the first current terminal coupled to the negative input;

a second transistor having a third current terminal, a fourth current terminal, and a second control terminal, the second control terminal coupled to the amplifier output and the third current terminal coupled to the negative input;

a first current mirror having a first current mirror input and a first current mirror output, the first current mirror input coupled to the second current terminal;

a second current mirror having a second current mirror input and a second current mirror output, the second current mirror input coupled the second current terminal; and a signal generator having a first signal generator input, a second signal generator input, a first signal generator output, and a second signal generator output, the first signal generator input coupled to the first current mirror output, the second signal generator input coupled to the second current mirror output, the first signal generator output coupled to the detector input, and the second signal generator output coupled to the second detector output.

12. The circuit of claim 11, further comprising a resistor coupled to the detector input, wherein the first current mirror is configured to generate, at the first current mirror output, a first current proportional to current flowing in a first direction through the resistor, and wherein the second current mirror is configured to generate, at the second current mirror output, a second current proportional to a current flowing in a second direction through the resistor.

13. The circuit of claim 10, wherein the phase delay unit comprises:

a current source coupled to the first phase delay input;

a flip-flop having a clock input, a clear input, a positive flip-flop output, and a negative flip-flop output, the clock input coupled to the second phase delay input and the negative flip-flop output coupled to the phase delay output;

a switch having a first terminal, a second terminal, and a control terminal, the first terminal coupled to the current source and the control terminal coupled to the positive flip-flop output; and a comparator having a negative comparator input, a positive comparator input, and a comparator output, the positive comparator input coupled to the second terminal and the comparator output coupled to the clear input.

14. The circuit of claim 13, wherein the switch is a first switch, the circuit further comprising:

a capacitor having a first capacitor terminal and a second capacitor terminal, the first capacitor terminal coupled to the second terminal and the second capacitor terminal coupled to a ground terminal, and a second switch having a third terminal, a fourth terminal, and a second control terminal, the third terminal coupled to the first capacitor terminal, the fourth terminal coupled to the second capacitor terminal, and the second control terminal coupled to the negative flip-flop output.

15. The circuit of claim 10, further comprising:
   a resistor; and
   a high-pass filter coupled between the resistor and the detector input.

16. The circuit of claim 10, wherein the converter is a first converter, the circuit further comprising:
   a second converter having a converter input and a converter output;
   a controller having a first controller terminal and a second controller terminal;
   a first resistor coupled between the detector input and the first controller terminal; and
   a second resistor coupled between the converter input and the second controller terminal.

17. The circuit of claim 10, wherein the converter is a first converter, the circuit further comprising:
   a second converter having a converter output; and
   a resistor coupled between the converter output and the detector input.

18. A system comprising:
   a first voltage converter having a first converter input, a first converter output, and a second converter output, the first converter input configured to receive a first voltage, the first voltage converter configured to:
      produce, at the first converter output, a second voltage based on the first voltage and
      produce, at the second converter output, a first signal based on the first voltage;
   a resistor having a first terminal and a second terminal, the first terminal coupled to the second converter output; and
   a second voltage converter having a second converter input, a third converter input, a third converter output, and a fourth converter output, the second converter input configured to receive the first voltage, the third converter input coupled to the second terminal, the second voltage converter configured to:
      produce, at the third converter output, a third voltage based on the first voltage; and
      produce, at the fourth converter output, a second signal based on the first signal.

19. The system of claim 18, wherein the resistor is a first resistor, the system further comprising:
   a second resistor having a third terminal and a fourth terminal, the third terminal coupled to the fourth converter output; and
   a third converter having a fourth converter input coupled to the fourth terminal.

* * * * *